(12) United States Patent
Day et al.

(10) Patent No.: US 8,930,679 B2
(45) Date of Patent: Jan. 6, 2015

(54) OUT-OF-ORDER EXECUTION MICROPROCESSOR WITH REDUCED STORE COLLISION LOAD REPLAY BY MAKING AN ISSUING OF A LOAD INSTRUCTION DEPENDENT UPON A DEPENDEE INSTRUCTION OF A STORE INSTRUCTION

(75) Inventors: Matthew Daniel Day, Austin, TX (US); Rodney E. Hooker, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 1213 days.

(21) Appl. No.: 12/604,767

(22) Filed: Oct. 23, 2009

(65) Prior Publication Data

US 2010/0306507 A1  Dec. 2, 2010

Related U.S. Application Data

(60) Provisional application No. 61/182,283, filed on May 29, 2009.

(51) Int. Cl.
| | | |
|---|---|---|
| G06F 9/34 | (2006.01) | |
| G06F 9/38 | (2006.01) | |
| G06F 9/30 | (2006.01) | |

(52) U.S. Cl.
CPC .......... *G06F 9/30174* (2013.01); *G06F 9/3838* (2013.01); *G06F 9/3834* (2013.01)
USPC ....................................... 712/217

(58) Field of Classification Search
None
See application file for complete search history.

(56) References Cited

U.S. PATENT DOCUMENTS

| | | | |
|---|---|---|---|
| 5,737,629 A | 4/1998 | Zuraski, Jr. et al. | |
| 5,974,525 A | 10/1999 | Lin et al. | |
| 5,987,595 A | 11/1999 | Yoaz et al. | |
| 6,006,326 A | 12/1999 | Panwar et al. | |
| 6,240,509 B1 | 5/2001 | Akkary | |
| 6,266,744 B1 * | 7/2001 | Hughes et al. | ................. 711/146 |
| 6,415,380 B1 | 7/2002 | Sato | |
| 6,442,677 B1 * | 8/2002 | Meyer et al. | ................... 712/216 |

(Continued)

OTHER PUBLICATIONS

Lebeck, Alvin R. et al. "A Large, Fast Instruction Window for Tolerating Cache Misses." Proceedings of the 29th Annual International Symposium on Computer Architecture. 2002 IEEE. pp. 1-12.

(Continued)

*Primary Examiner* — Keith Vicary
(74) *Attorney, Agent, or Firm* — Gary Stanford; James W. Huffman

(57) ABSTRACT

An out-of-order execution microprocessor for reducing the likelihood of having to replay a load instruction due to a store collision. The microprocessor includes a queue of entries, each entry configured to hold information that identifies sources of a store instruction used to compute its store address and to hold a dependency that identifies an instruction upon which the store instruction depends for its data. A register alias table (RAT), coupled to the queue of entries, is configured to encounter instructions in program order and to generate dependencies used to determine when the instructions may execute out of program order. In response to encountering a load instruction the RAT determines whether sources of the load instruction used to compute its load address match the sources of the store instruction in an entry of the queue, and if so, causes the load instruction to share the dependency of the matching store instruction.

20 Claims, 6 Drawing Sheets

(56) References Cited

U.S. PATENT DOCUMENTS

| | | | |
|---|---|---|---|
| 6,463,523 B1 * | 10/2002 | Kessler et al. | 712/216 |
| 6,493,820 B2 | 12/2002 | Akkary et al. | |
| 6,591,342 B1 * | 7/2003 | Akkary et al. | 711/125 |
| 6,622,237 B1 * | 9/2003 | Keller et al. | 712/216 |
| 6,625,723 B1 * | 9/2003 | Jourday et al. | 712/217 |
| 6,651,161 B1 | 11/2003 | Keller et al. | |
| 6,694,424 B1 | 2/2004 | Keller et al. | |
| 7,181,598 B2 * | 2/2007 | Jourdan et al. | 712/217 |
| 7,590,825 B2 | 9/2009 | Krimer et al. | |
| 7,721,066 B2 | 5/2010 | Yeh et al. | |
| 7,779,236 B1 * | 8/2010 | Isaman | 712/216 |
| 7,958,336 B2 | 6/2011 | Lahav et al. | |
| 7,996,646 B2 | 8/2011 | Yeh et al. | |
| 2002/0124156 A1 * | 9/2002 | Yoaz et al. | 712/225 |
| 2002/0194457 A1 | 12/2002 | Akkary | |
| 2003/0065909 A1 * | 4/2003 | Jourdan | 712/216 |
| 2004/0044881 A1 * | 3/2004 | Maier et al. | 712/218 |
| 2006/0095734 A1 * | 5/2006 | Filippo et al. | 712/218 |
| 2007/0226470 A1 * | 9/2007 | Krimer et al. | 712/225 |
| 2007/0288726 A1 * | 12/2007 | Luick | 712/225 |
| 2009/0037697 A1 * | 2/2009 | Ramani et al. | 712/214 |

OTHER PUBLICATIONS

Mcauley, Anthony J. et al. "Fast Routing Table Lookup Using CAMS." IEEE INFOCOM, 1993, pp. 1382-1391.

"Computer Dictionary The Comprehensive Standard for Business, School, Library and Home." © 1994, Microsoft Press, Second Edition, p. 326.

\* cited by examiner

US 8,930,679 B2

OUT-OF-ORDER EXECUTION MICROPROCESSOR WITH REDUCED STORE COLLISION LOAD REPLAY BY MAKING AN ISSUING OF A LOAD INSTRUCTION DEPENDENT UPON A DEPENDEE INSTRUCTION OF A STORE INSTRUCTION

CROSS REFERENCE TO RELATED APPLICATIONS

This application claims priority based on U.S. Provisional Application Ser. No. 61/182,283, filed May 29, 2009, entitled OUT-OF-ORDER EXECUTION MICROPROCESSOR WITH REDUCED STORE COLLISION LOAD REPLAY REDUCTION, which is hereby incorporated by reference in its entirety.

This application is related to the following co-pending U.S. patent applications which are concurrently filed herewith, and which have a common assignee and common inventors, each of which is incorporated by reference herein for all purposes.

| Serial Number | Title |
|---|---|
| (CNTR.2355) | OUT-OF-ORDER EXECUTION MICROPROCESSOR WITH REDUCED STORE COLLISION LOAD REPLAY REDUCTION |
| (CNTR.2486) | OUT-OF-ORDER EXECUTION MICROPROCESSOR WITH REDUCED STORE COLLISION LOAD REPLAY REDUCTION |

FIELD OF THE INVENTION

The present invention relates in general to out-of-order execution microprocessors, and more particularly to the performance of memory load instructions therein.

BACKGROUND OF THE INVENTION

Microprocessors have a load instruction that loads data from a source memory location to a register of the microprocessor and a store instruction that stores data from a register of the microprocessor to a destination memory location. Commonly, the microprocessor will encounter a load instruction that specifies a source memory address that overlaps with the destination memory address of an older store instruction. That is, the older store instruction is writing data to a memory address from which the load instruction is reading. This situation is commonly referred to as a store collision. In order to achieve correct program execution in the presence of a store collision, the microprocessor must ensure that the load instruction receives the data written by the older address-overlapping store instruction.

Out-of-order execution microprocessors execute instructions out of the program order. This can be problematic in the context of a store collision because the load instruction may be issued for execution before the older store instruction, thereby causing the load instruction to receive incorrect data. In such a case, the load instruction must not be allowed to retire the load data to its architectural destination register. Rather, the load instruction must receive the correct store data and retire the correct data to the destination register.

One way to cause the load instruction to receive the correct store data is to perform a replay. That is, the microprocessor detects the situation described above and forces the load instruction to be re-issued and re-executed after the store instruction has executed. Upon subsequent execution, the load instruction will receive the correct store data since the store instruction has been executed.

However, replays can be relatively expensive, particularly in microprocessors that are deeply pipelined. First, the store instruction may be dependent on other instructions—indeed, the store instruction may be at the end of a long chain of dependencies—such that it may not execute for potentially many clock cycles; thus, the load instruction must wait potentially many clock cycles before it can be replayed. The larger the number of clock cycles that the load instruction must wait to be replayed, the larger the penalty to process the load instruction. Additionally, the load instruction must pass back through the relevant pipeline stages again when it is re-issued and re-executed, which takes more clock cycles. The larger the number of pipeline stages that the load instruction must pass back through, the larger the penalty in terms of number of clock cycles to process the load instruction.

The system of U.S. Pat. No. 6,006,326 issued to Panwar et al. attempts to address this problem by employing a special array that stores color bits associated with load and store instructions. The color bits array includes entries corresponding to the instruction cache entries and is read when a load or store instruction is read from the instruction cache. The color bits of an entry in the array are updated to the same color value to indicate a dependency between a load and store instruction in response to a replay that was caused by issuing the load ahead of the store. When the store and load instructions are again placed in the pipeline for execution, the dependency checking logic detects that they have the same color and reports the dependency to the instruction scheduling logic, which does not schedule the load instruction until the similarly colored store instruction has been scheduled.

Because the color bits array must store color bits for each load and store instruction in the instruction cache, the size of the color bits array is a function of the instruction cache size. Thus, a potential disadvantage of the color bits array is that it may require a significant amount of storage space on the microprocessor since the number of entries of the instruction cache is typically relatively large. A relatively large color bits array may consume significant amounts of power and real estate space of the microprocessor. Another potential disadvantage of the color bits array scheme is that it relies upon the load instruction having already been replayed to cause the update of the color bits to indicate the dependency between the load and store instructions.

Therefore, what is needed is an improved mechanism for reducing the number of load instruction replays in the presence of store collisions in an out-of-order execution microprocessor.

BRIEF SUMMARY OF INVENTION

In one aspect, the present invention provides an out-of-order execution microprocessor for reducing the likelihood of having to replay a load instruction due to a store collision. The microprocessor includes a queue of entries, each entry configured to hold information that identifies sources of a store instruction used to compute its store address and to hold a dependency that identifies an instruction upon which the store instruction depends for its data. The microprocessor also includes a register alias table (RAT), coupled to the queue of entries, configured to encounter instructions in program order and to generate dependencies used to determine when the instructions may execute out of program order. In response to encountering a load instruction the RAT determines whether sources of the load instruction used to compute its load address match the sources of the store instruction in an entry of the queue, and if so, causes the load instruction to share the dependency of the matching store instruction.

In another aspect, the present invention provides a method for reducing the likelihood of having to replay a load instruction in an out-of-order execution microprocessor due to a store collision, the microprocessor having a register alias table (RAT) configured to encounter instructions in program order and to generate dependencies used to determine when the instructions may execute out of program order. The method includes allocating an entry in a queue of entries, in response to the RAT encountering a store instruction. The method also includes populating information in the allocated entry that identifies sources of the store instruction used to compute its store address. The method also includes populating the allocated entry to hold a dependency that identifies an instruction upon which the store instruction depends for its data. The method also includes determining, in response to the RAT encountering a load instruction, whether sources of the load instruction used to compute its load address match the sources of the store instruction in an entry of the queue. The method also includes causing the load instruction to share the dependency of the matching store instruction if the load instruction sources match the store instruction sources in an entry of the queue.

In another aspect, the present invention provides a computer program product for use with a computing device, the computer program product comprising a computer usable storage medium, having computer readable program code embodied in the medium, for specifying a an out-of-order execution microprocessor for reducing the likelihood of having to replay a load instruction due to a store collision. The computer readable program code includes first program code for specifying a queue of entries, each entry configured to hold information that identifies sources of a store instruction used to compute its store address and to hold a dependency that identifies an instruction upon which the store instruction depends for its data. The computer readable program code also includes second program code for specifying a register alias table (RAT), coupled to the queue of entries, the RAT configured to encounter instructions in program order and to generate dependencies used to determine when the instructions may execute out of program order, wherein in response to encountering a load instruction the RAT determines whether sources of the load instruction used to compute its load address match the sources of the store instruction in an entry of the queue, and if so, causes the load instruction to share the dependency of the matching store instruction.

DETAILED DESCRIPTION OF THE INVENTION

Figure 1:
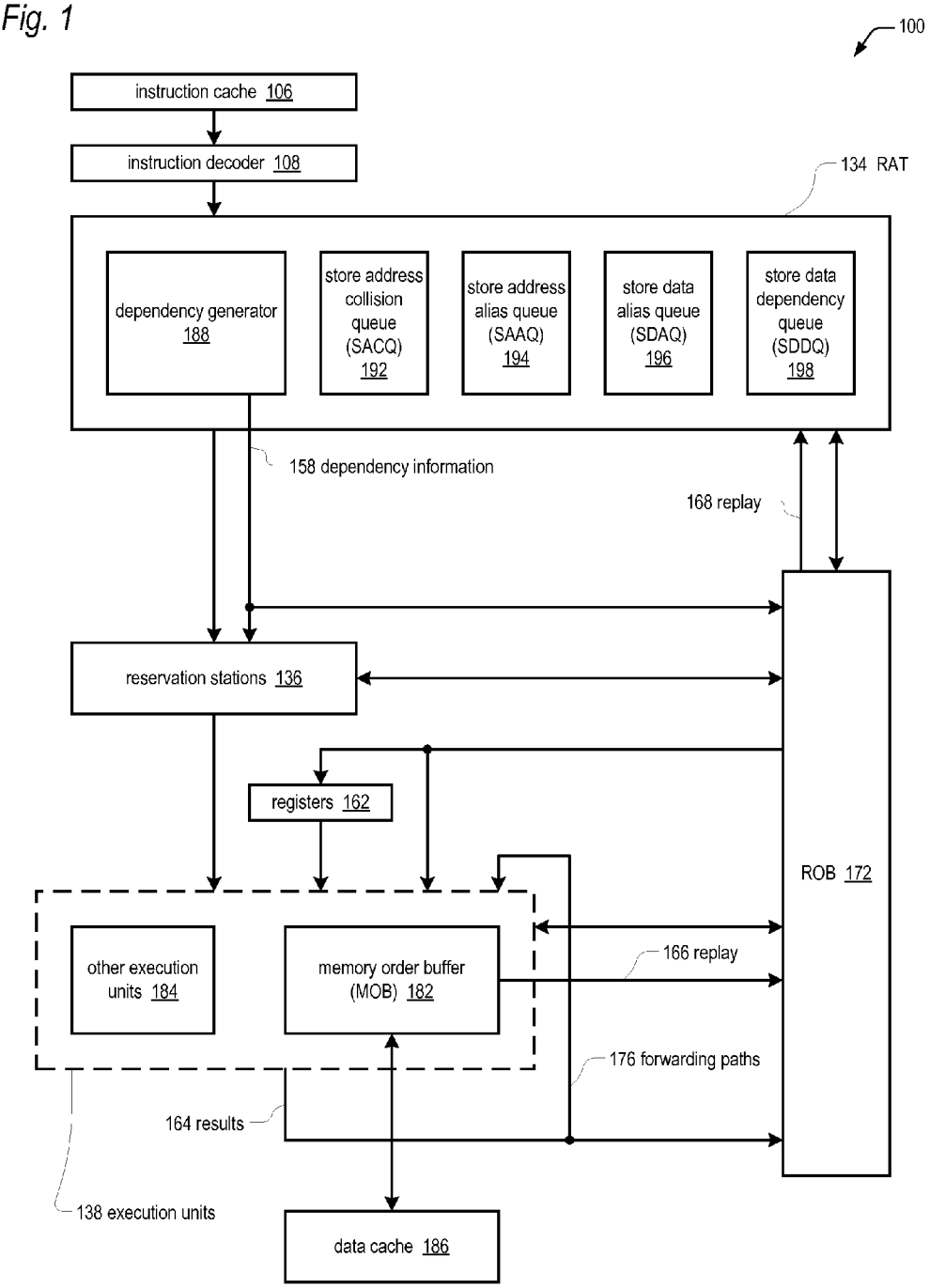
FIG. 1 is a block diagram illustrating a microprocessor with an enhanced register alias table (RAT) according to the present invention.

Described herein are embodiments of a pipelined out-of-order execution microprocessor that reduces the number of load instruction replays in the presence of store collisions. The microprocessor includes an enhanced register alias table (RAT) that predicts when a load instruction is involved in a store collision and causes the load instruction to be dependent upon an additional instruction that the load instruction would not normally be dependent upon. The additional instruction upon which the RAT makes the load instruction dependent is referred to herein as the dependee instruction. The additional, or enhanced, dependency causes the issue logic of the microprocessor to wait to issue the load instruction until the dependee instruction has executed, i.e., has produced its result, so that the dependee instruction result can be forwarded to the load instruction or read from the data cache. Consequently, when the issue logic does issue the load instruction for execution, the load instruction will not have to be replayed because it will receive the correct data.

In one embodiment, the RAT saves in a queue information that identifies the sources of operands used to calculate the store address of the most recent store instructions seen by the RAT. When the RAT encounters a load instruction, the RAT compares the sources used to calculate the load address with the store address sources in the queue. If there is a match, the RAT predicts a store collision and makes the load instruction share a dependency with the store instruction. That is, the RAT makes the load instruction dependent upon the same dependee instruction that the store instruction depends upon for its store data.

In another embodiment, when a load instruction is replayed because it received incorrect data because it collided with an older store whose store address had not yet been resolved, the RAT saves in a queue the instruction pointer of the load instruction and information that attempts to identify the store instruction. Subsequently, when the RAT encounters another instance of the load instruction, which is determined because its instruction pointer value matches one of the instruction pointers in the queue, the RAT makes the load instruction dependent upon the store instruction identified in the matching queue entry.

In another embodiment, when the RAT encounters a store instruction, it pushes into a first queue information that identifies the instruction upon which the store instruction depends for its store data, so that the first queue is storing dependency information associated with the store instructions most recently encountered by the RAT. When a load instruction is replayed because it received incorrect data because it collided with an older store whose store data was not yet available, the RAT saves in a second queue the instruction pointer of the load instruction. Subsequently, when the RAT encounters another instance of the load instruction, which is determined because its instruction pointer value matches one of the instruction pointers in the queue, the RAT makes the load instruction dependent upon the instruction upon which one of the store instructions in the first queue depends for its store data. The RAT selects the store instruction from the first queue depending upon a replay history of the load instruction maintained in each second queue entry. The RAT clears the history when it allocates the entry, and increments it on each replay of the load instruction. If the history exceeds a predetermined value, the RAT makes the load instruction an ordered load such that the load instruction is not issued until all older store instructions have issued.

Referring now to FIG. 1, a block diagram illustrating a microprocessor 100 with an enhanced RAT 134 according to the present invention is shown. In one embodiment, the macroarchitecture of the microprocessor 100 is an x86 macroarchitecture. A microprocessor has an x86 macroarchitecture if it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set. However, the load instruction replay reduction mechanisms described herein may be employed in microprocessors of other architectures, both existing and future.

The microprocessor 100 includes an instruction cache 106 that caches program instructions from a system memory (not shown). The microprocessor 100 also includes an instruction decoder 108 that receives instructions from the instruction cache 106 and decodes them. In one embodiment, the instruction decoder 108 includes an instruction translator that translates macroinstructions of a macroinstruction set of the microprocessor 100 (such as the x86 instruction set architecture) into microinstructions of a microinstruction set architecture of the microprocessor 100. In particular, the instruction decoder 108 translates memory access instructions, such as x86 MOV, PUSH, POP, CALL, RET, etc. instructions into a sequence of microinstructions that includes one or more load or store microinstructions, which are simply referred to herein as a load instruction or a store instruction. In other embodiments, the load and store instructions are part of the native instruction set of the microprocessor 100.

The microprocessor 100 also includes a register alias table (RAT) 134, coupled to the instruction decoder 108; reservation stations 136, coupled to the RAT 134; a reorder buffer (ROB) 172, coupled to the RAT 134 and to the reservation stations 136; execution units 138, coupled to the reservation stations 136 and the ROB 172; and architectural registers 162, coupled to the ROB 172 and to the execution units 138.

The execution units 138 include a memory order buffer (MOB) 182, or memory subsystem 182, which executes memory access instructions, i.e., load and store instructions. In particular, the MOB 182 reads and writes data from and to a data cache 186 that is coupled to the MOB 182 in response to load and store instructions. Additionally, the MOB 182 corresponds with a bus interface unit (not shown) to read and write data from and to a system memory. Although the MOB 182 may receive load instructions and store instructions to execute out of program order, the MOB 182 correctly resolves store collisions. That is, the MOB 182 ensures that each load instruction receives the correct data, in particular, from the correct store instruction (or store instructions in the case that multiple store instructions supply the data specified by a single load instruction) in the case of a store collision. If necessary, the MOB 182 generates a replay signal 166 to the ROB 172 to request the ROB 172 to replay a load instruction to ensure that it receives the correct data. However, embodiments described herein attempt to reduce the number of replays that the MOB 182 must request. The execution units 138 also include other execution units 184, such as integer execution units, floating point units, multimedia units, and the like, that execute non-memory access instructions.

The RAT 134 receives the decoded instructions from the instruction decoder 108 in program order and determines the dependencies of each instruction on other unretired instructions in the microprocessor 100. The RAT 134 stores register renaming information associated with each unretired instruction in the microprocessor 100. The register renaming information incorporates the program order of the instructions. Additionally, the RAT 134 includes a complex state machine that controls various actions of the microprocessor 100 in response to the renaming information and its other inputs, as described herein.

The RAT 134 includes a dependency generator 188 that generates dependency information 158 for each instruction based on its program order, on the operand sources it specifies, and on the renaming information. The dependency information 158 includes an identifier for each input operand of the instruction, namely an identifier of the dependee instruction upon which the input operand depends, if any. In one embodiment, the identifier is an index into the ROB 172 that identifies an entry in the ROB 172 that stores the dependee instruction and status information related thereto, discussed below.

The dependency information 158 includes normal dependency information. The dependency information 158 also includes enhanced, or additional, dependency information for load instructions to reduce the likelihood of a load replay in the presence of a store collision, as described herein. The RAT 134 generates the normal dependency information based on the registers that supply the source operands of the instruction. For example, in the code sequence shown below in Table 1, the ADD instruction in line (1) adds the contents of R5 and R6 and places the result in R3. The SUB instruction in line (2) subtracts the contents of R8 from R3 and places the result in R7. Therefore, the SUB has a dependency on the ADD because the ADD is older than the SUB in program order and the SUB instruction specifies R3 as a source of one of its input operands, and the ADD specifies R3 as the destination of its result. Therefore, the normal dependency information for the first input operand source of the SUB instruction includes the ROB index of the ADD instruction to cause the reservation stations 136 to wait to issue the SUB until the ADD has executed, i.e., has generated its result such that the result is available to the SUB instruction. In an embodiment in which the microprocessor 100 performs register renaming, the registers that source the input operands may be temporary registers of the ROB 172 to which the architectural registers 162 are renamed.

TABLE 1

| (1) | ADD | R3, | R5, | R6 |
| (2) | SUB | R7, | R3, | R8 |

The RAT 134 is enhanced to predict when a load instruction is involved in a store collision and to generate enhanced dependency information in addition to the normal dependency information that causes the load instruction to be dependent upon an additional instruction that the load instruction would not normally be dependent upon. The RAT 134 generates the enhanced dependency information for the purpose of reducing the likelihood that the load instruction will have to be replayed, as described herein. In one embodiment, the RAT 134 makes a load instruction dependent upon a dependee instruction by including the ROB index of the dependee instruction in an otherwise unused input operand field (a third input operand field) of the load instruction.

The RAT 134 includes a plurality of queues that the RAT 134 employs to make the store collision prediction and to generate the enhanced load instruction dependency. The queues include a store address collision queue (SACQ) 192, a store address alias queue (SAAR) 194, a store data alias queue (SDAQ) 196, and a store data dependency queue (SDDQ) 198, for which the entries of each are described in more detail below with respect to FIGS. 2, 6, 8, and 9, respectively.

The RAT 134 dispatches the decoded instructions and their associated dependency information 158 to the reservation stations 136. Prior to dispatching an instruction, the RAT 134 allocates an entry in the ROB 172 for the instruction. Thus, the instructions are allocated in program order into the ROB 172, which is configured as a circular queue. This enables the ROB 172 to guarantee that the instructions are retired in program order. The RAT 134 also provides the dependency information 158 to the ROB 172 for storage in the instruction's entry therein. When the ROB 172 replays an instruction, such as a load instruction, the ROB 172 provides the dependency information stored in the ROB entry to the reservation stations 136 during the replay of the instruction.

The reservation stations 136 include queues that hold the instructions and dependency information 158 received from the RAT 134. The reservation stations 136 also include issue logic that issues the instructions from the queues to the execution units 138 when they are ready to be executed. An instruction is ready to be issued and executed when all of its dependencies are resolved. An instruction dependency is resolved when the dependee instruction has executed such that its result is available to the dependent instruction, i.e., the result is available to the execution unit 138 that will execute the dependent instruction. The execution units 138 may receive the results 164 of executed instructions via the architectural registers 162, via temporary registers (not shown) in the ROB 172 to which the architectural registers 162 are renamed, or directly from the execution units 138 themselves via forwarding paths 176. The execution units 138 also provide their results 164 to the ROB 172 for writing into the temporary registers.

The MOB 182 resolves, i.e., computes, load addresses for load instructions and resolves store addresses for store instructions using the source operands specified by the load and store instructions. The sources of the operands may be the architectural registers 162, constants, and/or displacements specified by the instruction. The MOB 182 also reads load data from the data cache 186 at the computed load address. The MOB 182 also writes store data to the data cache 186 at the computed store address. In one embodiment, the MOB 182 includes a load unit that executes load instructions and one or more store units that execute store instructions.

As mentioned above, in some circumstances the MOB 182 must request a replay of a load instruction, which it indicates via the replay signal 166 that is provided to the ROB 172. The replay signal 166 specifies the ROB index of the instruction that must be replayed, such as a load instruction, so that the ROB 172 can update the indexed entry with an indication that the replay is needed. In one embodiment, the replay signal 166 also specifies the ROB index of the store instruction that collides with the load instruction that is causing the load instruction to be replayed. When the instruction whose ROB entry is marked as needing to be replayed is next to be retired, i.e., is the oldest unretired instruction, the ROB 172 replays the load instruction. That is, the ROB 172 re-dispatches the load instruction and its associated dependency information 158 from the ROB 172 to the reservation stations 136 to await subsequent re-issuance to the execution units 138 and re-execution thereby. In one embodiment, the ROB 172 replays not only the load instruction, but also replays all instructions newer than the load instruction. When the ROB 172 replays the load instruction, the ROB 172 also signals this event to the RAT 134 via the replay signal 168. The replay signal 168 specifies the ROB index of the load instruction being replayed.

Figure 2:
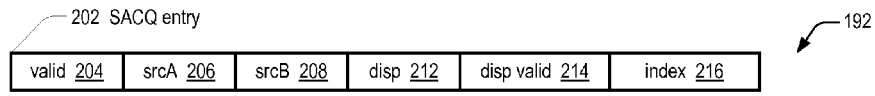
FIG. 2 is a block diagram illustrating an entry in the store address collision queue (SACQ) of FIG. 1 according to the present invention.

Referring now to FIG. 2, a block diagram illustrating an entry 202 in the store address collision queue (SACQ) 192 of FIG. 1 according to the present invention is shown. The SACQ entry 202 holds information associated with a store instruction encountered by the RAT 134. The RAT 134 allocates, populates, and uses the SACQ entries 202 as described below with respect to FIGS. 3 and 4. The SACQ entry 202 includes a valid bit 204 that indicates whether the entry 202 is valid. In response to a reset, the microprocessor 100 initializes all entries 202 of the SACQ 192 to invalid, i.e., clears the valid bit 204 of each SACQ entry 202. The SACQ entry 202 also includes a srcA field 206 and a srcB field 208 that identify a source of first and second operands, respectively, that the MOB 182 uses to compute the store address of a store instruction. The srcA field 206 and a srcB field 208 specify architectural registers 162 that hold the operands or constants used as the operands. The SACQ entry 202 also includes a displacement field 212 that holds a displacement specified by a store instruction that the MOB 182 uses to compute its store address. The SACQ entry 202 also includes a displacement valid bit 214 that indicates whether the displacement field 212 value is valid. The SACQ entry 202 also includes an index field 216 that holds the ROB index of the dependee instruction from which the store instruction depends for its store data, if any. In one embodiment, the RAT 134 populates the index field 216 with a predetermined value to indicate that the store instruction has no dependencies for its store data.

Figure 3:
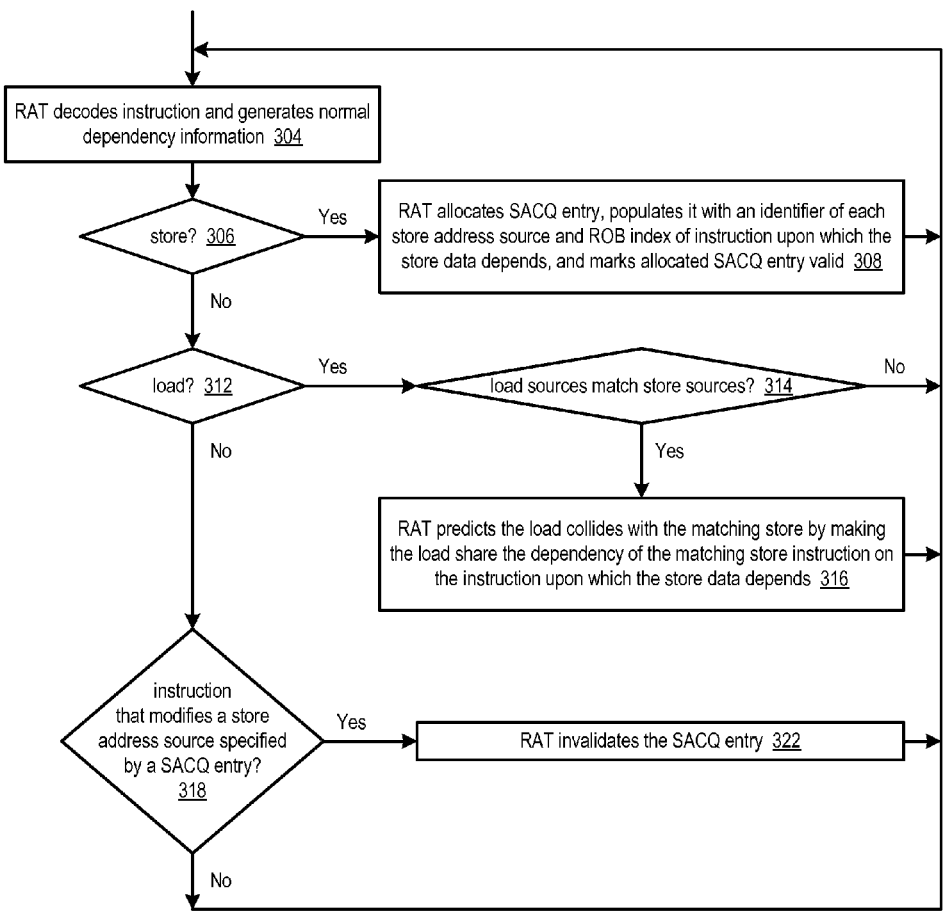
FIG. 3 is a flowchart illustrating operation of the RAT of FIG. 1 according to the present invention.

Referring now to FIG. 3, a flowchart illustrating operation of the RAT 134 of FIG. 1 according to the present invention is shown. Flow begins at block 304.

At block 304, the RAT 134 decodes an instruction and generates its normal dependency information, which is included in the dependency information 158 of FIG. 1. Flow proceeds to decision block 306.

At decision block 306, the RAT 134 determines whether the decoded instruction is a store instruction. If so, flow proceeds to block 308; otherwise, flow proceeds to decision block 312.

At block 308, the RAT 134 allocates an entry 202 in the SACQ 192. That is, logically the RAT 134 pushes an entry 202 into the tail of the SACQ 192, which logically pushes out the entry 202 at the head of the SACQ 192. The RAT 134 then populates the srcA field 206, srcB field 208, and displacement field 212 of the allocated entry 202 with the appropriate information from the store instruction. The RAT 134 sets the displacement valid bit 214 if the store instruction specifies a displacement; otherwise, the RAT 134 clears the displacement valid bit 214. The RAT 134 also populates the index field 216 with the ROB index of the dependee instruction from which the store instruction depends for its store data, if any. Finally, the RAT 134 sets the valid bit 204. In one embodiment, the store instruction is actually two separate microinstructions: a store address (STA) microinstruction and a store data (STD) microinstruction. The STA instruction is issued to a store address unit of the MOB 182 that calculates the store address. The STD instruction is issued to a store data unit of the MOB 182 that obtains the store data from the source register and posts the store data to a store buffer, for subsequent writing to memory. In this embodiment, the RAT 134 allocates the entry 202 in the SACQ 192 and populates the srcA field 206, srcB field 208, and displacement field 212 when it sees the STA instruction, and the RAT 134 populates the index field 216 with the ROB index of the dependee instruction from which the STD microinstruction depends for its store data, if any, and sets the valid bit 204 when it sees the STD instruction. Flow returns to block 304.

At decision block 312, the RAT 134 determines whether the decoded instruction is a load instruction. If so, flow proceeds to decision block 314; otherwise, flow proceeds to decision block 318.

At decision block 314, the RAT 134 compares the sources specified by the load instruction with the store instruction sources specified by the SACQ 192 entries 202 to determine whether they match with any of the store instructions associated with the entries 202. That is, the RAT 134 compares the first source operand field of the load instruction with the srcA field 206 of each entry 202, compares the second source operand field of the load instruction with the srcB field 208 of each entry 202, and compares the displacement field of the load instruction with the displacement field 212 of each entry 202. In one embodiment, the RAT 134 also allows the load instruction to specify the same source registers, but in swapped order. If for any of the entries 202 in the SACQ 192 the three fields match, and if the load instruction specifies a displacement and the displacement valid bit 214 is set or the load instruction does not specify a displacement and the displacement valid bit 214 is clear, then flow proceeds to block 316; otherwise, flow returns to block 304.

At block 316, the RAT 134 predicts that the load instruction will collide with the older store instruction associated with the matching SACQ 192 entry 202 and responsively makes the load instruction share the store instruction's dependency for its store data. That is, the RAT 134 generates enhanced dependency information 158 for the load instruction that specifies the value of the index field 216 of the matching SACQ entry 202 determined at block 314. In one embodiment, the MOB 182 is configured such that if it receives in the same clock cycle a load instruction and a store instruction that are the subject of a store collision, then the MOB 182 is capable of forwarding the correct data from the store instruction to the load instruction such that the load instruction does not need to be replayed. Thus, by generating the enhanced dependency such that the load instruction shares the dependency with the predicted colliding store instruction on the dependee instruction on which the store instruction depends for its store data, the RAT 134 will cause the reservation stations 136 to wait to issue the load and predicted colliding store instructions after the dependee instruction and in most cases the load instruction will issue no earlier than the predicted colliding store instruction. Flow returns to block 304.

At decision block 318, the RAT 134 determines whether the decoded instruction is an instruction that modifies a source specified by either the srcA 206 or srcB 208 fields of any of the entries 202 of the SACQ 192. If so, flow proceeds to block 322; otherwise, flow returns to block 304.

At block 322, the RAT 134 clears the valid bit 204 of each SACQ entry 202 that specifies a register in its srcA 206 or srcB 208 fields that is modified by the instruction as determined at decision block 318. The RAT 134 clears the valid bit 204 because it is now unlikely that the load address and store address will overlap; thus, it is unlikely to be beneficial to make a subsequent load instruction share the store data dependency with the store instruction associated with the SACQ entry 202. Flow returns to block 304.

Figure 4:
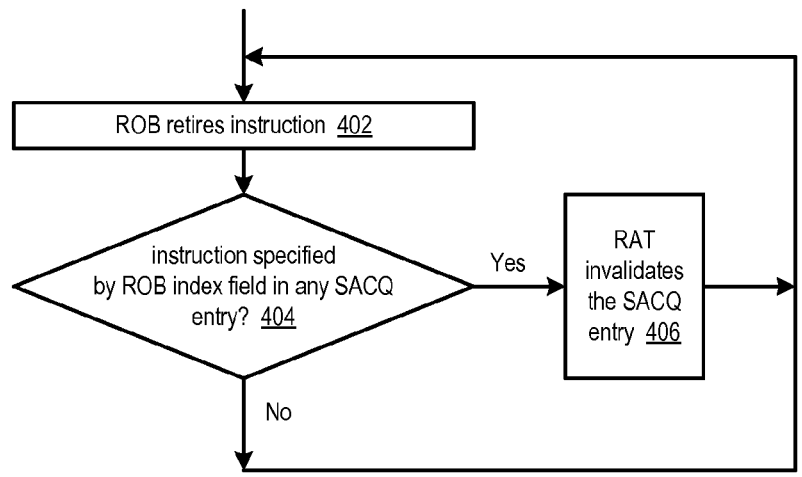
FIG. 4 is a flowchart illustrating operation of the ROB of FIG. 1 according to the present invention.

Referring now to FIG. 4, a flowchart illustrating operation of the ROB 172 of FIG. 1 according to the present invention is shown. Flow begins at block 402.

At block 402, the ROB 172 retires an instruction and notifies the RAT 134. Flow proceeds to decision block 404.

At decision block 404, the RAT 134 scans the SACQ 192 to determine whether the index field 216 of any of its entries 202 match the index of the instruction that is being retired by the ROB 172. If so, flow proceeds to block 406; otherwise, flow returns to block 402.

At block 406, the RAT 134 clears the valid bit 204 of the matching SACQ entry 202. This prevents the RAT 134 from generating an enhanced dependency for a subsequent load instruction on an instruction that has already been retired. Flow returns to block 402.

Figure 5:
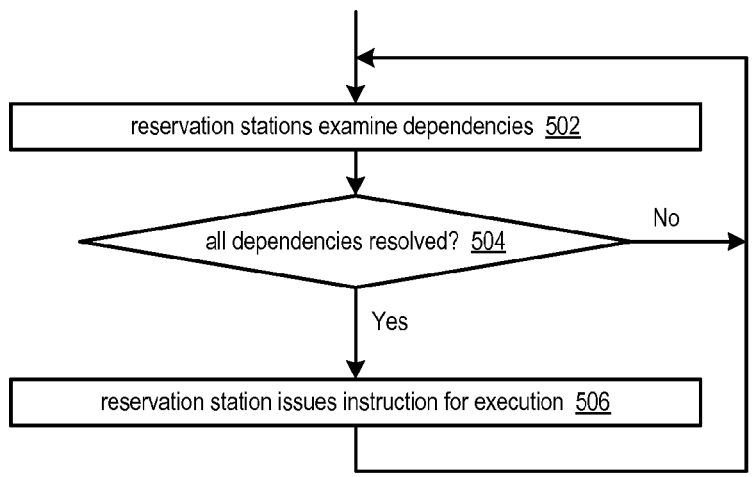
FIG. 5 is a flowchart illustrating operation of the reservation stations of FIG. 1 according to the present invention.

Referring now to FIG. 5, a flowchart illustrating operation of the reservation stations 136 of FIG. 1 according to the present invention is shown. Flow begins at block 502.

At block 502, the reservation stations 136 examine the dependency information of the instructions. Flow proceeds to decision block 504.

At decision block 504, the reservation stations 136 determine whether all the dependencies specified by the dependency information associated with an instruction have been resolved. In one embodiment, the reservation stations 136 examine a complete bit within the ROB 172 entry specified by the ROB indexes of the dependency information 158, and if all the complete bits are set, then the dependencies have been resolved. When an execution unit 138 generates a result of an instruction, the execution unit 138 sets the complete bit in the ROB 172 entry associated with the instruction. In particular, in the case of a load instruction for which the RAT 134 previously generated an enhanced dependency as described at block 316 of FIG. 3, the reservation station 136 determines whether the instruction upon which the predicted colliding store instruction depends for its store data is complete. If all the dependencies have been resolved for an instruction, flow proceeds to block 506; otherwise, flow returns to block 502.

At block 506, the reservation station 136 issues the instruction whose dependencies have been resolved to the appropriate execution unit 138. Flow returns to block 502.

Operation of the microprocessor 100 of FIG. 1 according to an embodiment of FIGS. 2-5 will now be described with respect to processing of the code sequences in Tables 2 and 3 below. For simplicity, the load and store instructions in the examples do not include a displacement value. The ADD instruction in line (1) adds the contents of R5 and R6 and places the result in R3. The ST instruction in line (2) stores the contents of R3 to memory at the store address computed by adding the contents of R1 and R2. The LD instruction in line (3) loads into R7 the contents of memory at the load address computed by adding the contents of R1 and R2.

TABLE 2

| (1) | ADD | R3, | R5, | R6 |
|---|---|---|---|---|
| (2) | ST | R3, | R1, | R2 |
| (3) | LD | R7, | R1, | R2 |

When the RAT 134 encounters the ST instruction in line (2), it performs the steps described with respect to blocks 304 through 308 of FIG. 3. That is, it generates the normal dependency information 158, allocates an entry in the SACQ 192, and populates the srcA field 206 with R1 and populates the srcB field 208 with R2. Additionally, the RAT 134 populates the index field 216 with the ROB index of the ADD instruction of line (1) because the ST depends upon the ADD for its store data because R3 is the store data source register of the ST and R3 is the destination register of the result of the ADD. Finally, the RAT 134 clears the displacement valid bit 214 and sets the valid bit 204.

When the RAT 134 encounters the LD instruction in line (3), it performs the steps described with respect to blocks 304 and 312 through 316 of FIG. 3. That is, it generates the normal dependency information 158, detects at decision block 314 that the load address sources R1 and R2 match the srcA field 206 and srcB field 208 of the SACQ entry 202 just populated for the ST, and responsively generates enhanced dependency information 158. The enhanced dependency information is the value of the index field 216 of the SACQ entry 202 just populated for the ST, which causes the LD to be dependent upon the ADD instruction in line (1), i.e., which causes the LD to share the dependency the ST instruction has upon the ADD for its store data. Consequently, according to FIG. 5, the reservation stations 136 will not issue the LD instruction until the ADD has completed, i.e., until the result of the ADD instruction is available to the ST instruction, which will forward the result to the LD.

Furthermore, as described with respect to FIG. 4, when the ROB 172 retires the ADD instruction in line (1), it clears the valid bit 204 of the SACQ entry 202 associated with the ST in line (2).

The code sequence of Table 3 is similar to the code sequence of Table 2; however, in line (2') between the ST of line (2) and the LD of line (3) there is a SUB instruction that subtracts the contents of R9 from R8 and places the result in R1.

TABLE 3

| (1) | ADD | R3, | R5, | R6 |
| (2) | ST | R3, | R1, | R2 |
| (2') | SUB | R1, | R8, | R9 |
| (3) | LD | R7, | R1, | R2 |

When the RAT 134 encounters the SUB instruction in line (2'), it performs the steps described with respect to blocks 304 and 318 through 322 of FIG. 3. That is, it generates the normal dependency information 158 and clears the valid bit 204 of the SACQ entry 202 associated with the ST in line (2) because the SUB modifies R1, which is specified in the srcA field 206 of the entry 202.

As may be observed from the description of FIGS. 1-5 and Tables 1 through 3, the RAT 134 advantageously generates an enhanced dependency such that the LD depends upon the same instruction as the ST. This is because the RAT 134 does not generate a normal dependency for the LD upon the ST, even though their load address and store address may collide, because the load address and the store address are not yet generated when the RAT 134 encounters the LD and ST.

An advantage of the embodiment of FIGS. 2-5 over the color bits array-based system of U.S. Pat. No. 6,006,326 described above is that the present embodiment does not require the load to replay on a previous execution of the load instruction in order to make a prediction of the store collision and generate the enhanced dependency information; rather, the embodiment may avoid a load replay altogether, i.e., may avoid a replay on the first execution instance of the load and store instructions in the event that the sources used to compute the load address and store address are the same. Given the potentially large penalty in terms of clock cycles associated with a replay, as discussed above, this may be a significant advantage.

This advantage is obtained at the expense that the RAT may potentially generate an enhanced dependency of the load that is a false dependency. That is, the RAT mispredicted the store collision because the load address and the store address do not collide, which may actually cause the microprocessor to take longer to execute the load instruction because the load instruction could have been issued before the dependee instruction of the enhanced dependency completed and the load instruction would not have needed to be replayed. However, the present inventors have found that, for many programs, the benefit of the reduced number of load instruction replays greatly outweighs the consequences of the mispredictions. This is likely due to the relatively large penalty associated with the replay, which in one embodiment is on the order of fifteen clock cycles, relative to the penalty associated with the misprediction, which in one embodiment is on the order of one or two clock cycles, as well as the high probability that the load and store addresses will overlap if their address sources are the same.

An additional advantage of the embodiment of FIGS. 2-5 over the system of U.S. Pat. No. 6,006,326 described above is that it potentially does not require as much storage space as the color bits array, which provides the concomitant space and power cost saving advantages described above. Although each entry of the SACQ potentially stores more bits than one embodiment of the color bits array, the number of entries in the SACQ is likely much smaller than the number of entries in the color bits array since the color bits array includes an entry for each instruction (or possibly block) of the instruction cache; whereas, the number of entries in the SACQ may be much smaller. For example, in one embodiment of the microprocessor, the present inventors have found that a SACQ with four entries provides a significant reduction in the number of load replays.

Yet another advantage of the embodiment of FIGS. 2-5 (and the embodiment of FIGS. 8-11) over the system of U.S. Pat. No. 6,006,326 described above is that it potentially allows the load instruction to be issued sooner than the color bits array system. In particular, the color bits array scheme creates a dependency of the load instruction upon the store instruction itself, which means that the load instruction cannot be issued until the store instruction executes; whereas, the embodiments of FIGS. 2-5 and FIGS. 8-11 generate an enhanced dependency upon the dependee instruction upon which the colliding store instruction depends for its store data, rather than generating a dependency upon the colliding store instruction itself as does U.S. Pat. No. 6,006,326, which means that in some cases the load instruction may be issued by the embodiments described herein sooner than it would by the embodiments described in U.S. Pat. No. 6,006,326.

As will now be explained with reference to the code fragment of Table 4, the embodiment of FIGS. 2-5 does not predict a store collision in some situations. However, advantageously, embodiments of FIGS. 6-11 may predict a store collision in those situations, as described below. The code fragment of Table 4 is similar to the code fragment of Table 2; however, the LD instruction in line (3) uses the contents of R8, rather than R2, to R1 to compute the load address. Consequently, because the ST instruction in line (2) does not specify the same sources for calculating the store address that the LD instruction in line (3) specifies for calculating the load address, the SACQ 192 will not predict the potential store collision according to FIGS. 2-5, even though the LD and ST addresses match; however, advantageously, the embodiments of FIGS. 6-11 may predict the potential store collision.

TABLE 4

| (1) | ADD | R3, | R5, | R6 |
|-----|-----|-----|-----|-----|
| (2) | ST  | R3, | R1, | R2 |
| (3) | LD  | R7, | R1, | R8 |

Figure 6:
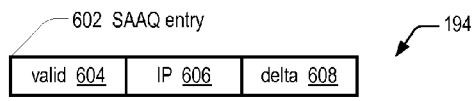
FIG. 6 is a block diagram illustrating an entry in the store address alias queue (SAAR) of FIG. 1 according to the present invention.

Referring now to FIG. 6, a block diagram illustrating an entry 602 in the store address alias queue (SAAQ) 194 of FIG. 1 according to the present invention is shown. The SAAQ entry 602 holds information associated with a load instruction that was replayed because it received incorrect data because its load address collided with an older store instruction whose store address had not yet been generated. The RAT 134 allocates, populates, and uses the SAAQ entries 602 as described below with respect to FIG. 7. The SAAQ entry 602 includes a valid bit 604 that indicates whether the entry 602 is valid. In response to a reset, the microprocessor 100 initializes all entries 602 of the SAAQ 194 to invalid, i.e., clears the valid bit 604 of each SAAQ entry 602. Additionally, in one embodiment, the valid bit 604 of each SAAQ entry 602 is cleared each time the code segment (CS) limit value in the x86 CS segment descriptor is written. The SAAQ entry 602 also includes an instruction pointer (IP) field 606 that stores the memory address at which the load instruction resides. In one embodiment, the IP 606 is the memory address of the next instruction after the load instruction, rather than the address of the load itself. The SAAQ entry 602 also includes a delta field 608 that stores the difference between the ROB index of the load instruction and the ROB index of the store instruction (in one embodiment, of the STA instruction) that is the culprit of the load instruction replay, as discussed below.

Figure 7:
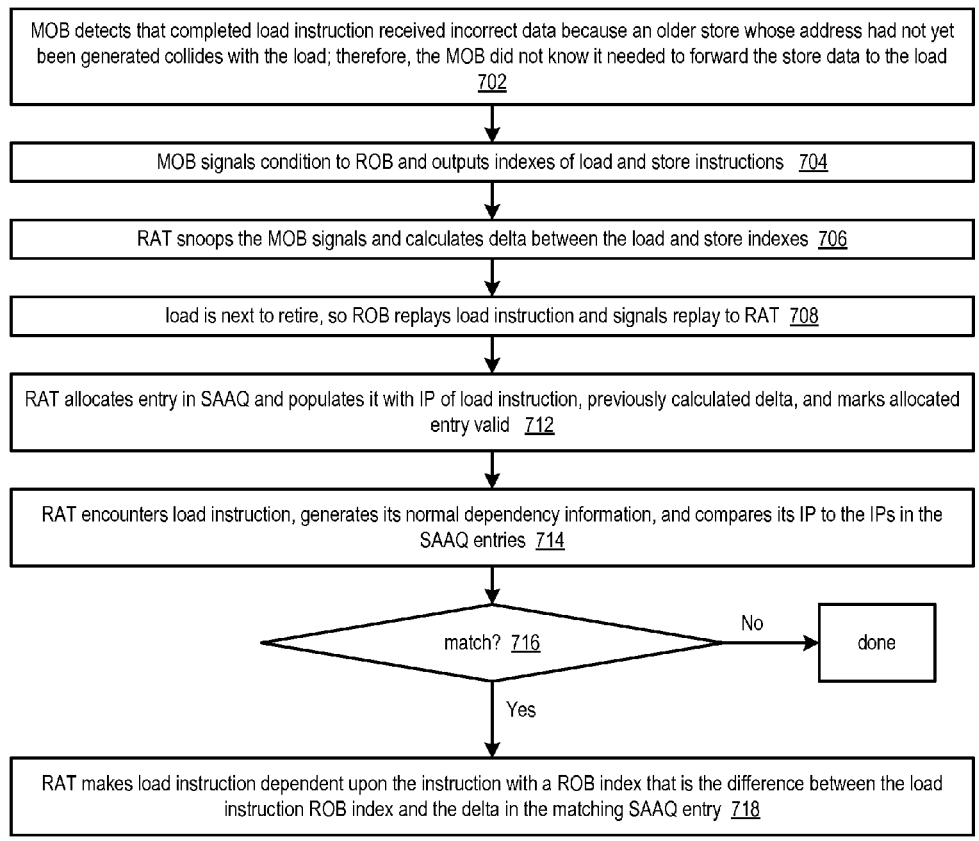
FIG. 7 is a flowchart illustrating operation of the microprocessor of FIG. 1 to generate enhanced dependency information for a load instruction to potentially avoid a replay in the presence of a store collision according to the present invention.

Referring now to FIG. 7, a flowchart illustrating operation of the microprocessor 100 of FIG. 1 to generate enhanced dependency information for a load instruction to potentially avoid a replay in the presence of a store collision according to the present invention is shown. Flow begins at block 702.

At block 702, the MOB 182 detects that a completed load instruction received incorrect data because an older store instruction whose address had not yet been generated by the MOB 182 collides with the load instruction. Consequently, the MOB 182 did not detect that it needed to forward the store data of the colliding store instruction to the load instruction. In one embodiment, the MOB 182 allows load instructions to access the data cache 186 even though it knows that there are one or more older store instructions whose store addresses have not yet been resolved, i.e., even though it knows a store collision possibility exists between the load and a store with an unresolved store address. The MOB 182 does this in hopes that a store collision does not exist, in which case the load instruction can execute more quickly than it would if the MOB 182 required it to wait until the store address was resolved. A consequence of this is that the load instruction may have to be replayed if a store collision condition exists, i.e., if the load received incorrect data because it should have been forwarded the correct data from the colliding store whose address had not yet been resolved. Flow proceeds to block 704.

At block 704, the MOB 182 generates the replay signal 166 to the ROB 172 to indicate the condition detected at block 702. In particular, the MOB 182 outputs the ROB index of the load and store instructions, which the ROB 172 uses to update the load instruction ROB 172 entry status to indicate that it needs to be replayed. Flow proceeds to block 706.

At block 706, the RAT 134 snoops the replay signal 166 generated by the MOB 182 at block 704, notes the load replay request, and calculates the difference between the load instruction index and the store instruction index and locally stores the difference, or delta. In one embodiment, the RAT takes into account the wrap around affect of the circular queue nature of the ROB 172 when calculating the delta. In the example of Table 4, at block 704 the MOB 182 outputs the ROB index of the LD in line (3) and the ST in line (2); since these two instructions are adjacent in program order, the RAT 134 calculates their delta to be one. As discussed above, in one embodiment, the ST instruction in line (2) is actually two separate microinstructions: a store address (STA) microinstruction followed by a store data (STD) microinstruction. In this embodiment, at block 704 the ROB 172 outputs the ROB index of the STA microinstruction, which precedes the STD microinstruction in program order; therefore, the RAT 134 calculates the delta between the load instruction ROB index and the STA ROB index to be two. Flow proceeds to block 708.

At block 708, the ROB 172 determines that the load instruction is next to retire, i.e., it has become the oldest instruction in the ROB 172. The ROB 172 sees that the load instruction is marked as needing to be replayed and replays the load instruction. That is, the ROB 172 re-dispatches the load instruction and its associated dependency information 158 from the ROB 172 to the reservation stations 136 to await subsequent re-issuance to the execution units 138 and re-execution thereby. In one embodiment, the ROB 172 replays not only the load instruction, but also replays all instructions newer than the load instruction. Additionally, the ROB 172 generates the replay signal 168 to the RAT 134. Flow proceeds to block 712.

At block 712, in response to the replay signal 168 generated at block 708, the RAT 134 allocates an entry 602 in the SAAQ 194. That is, logically the RAT 134 pushes an entry 602 into the tail of the SAAQ 194, which logically pushes out the entry 602 at the head of the SAAQ 194. The RAT 134 then populates the IP field 606 with the instruction pointer value of the load instruction. The RAT 134 also populates the delta field 608 with the difference value calculated at block 706. Finally, the RAT 134 sets the valid bit 604. Flow proceeds to block 714.

At block 714, the RAT 134 encounters a load instruction and generates its normal dependency information for the load instruction. Additionally, the RAT 134 compares the instruction pointer value of the load instruction with the IP field 606 in each of the valid entries 602 of the SAAQ 194. Flow proceeds to decision block 716.

At decision block 716, the RAT 134 determines whether the comparison performed at block 714 yields a match with any of the SAAQ entries 602. If not, flow ends; otherwise, flow proceeds to block 718. It is noted that the instance of the load instruction encountered by the RAT 134 at block 714/716/718 is a different instance than the one for which the instruction pointer was saved at block 712. For this reason, when a load instruction is replayed, the RAT 134 does not populate the SAAQ entry 602 with the actual ROB index of the store instruction. Rather, advantageously, when a load instruction is replayed, the RAT 134 populates the SAAQ entry 602 with the difference between the ROB indexes of the load instruction and store instruction on the first instance so that on the second and subsequent instances of the load instruction, the RAT 134 can generate the enhanced dependency on the instruction at the previously determined delta

608 from the current load instruction instance, as described below with respect to block 718. The present inventors have determined that there is a high likelihood that the ROB index delta between the load instruction and the store instruction the load needs to wait on will be the same on the instances subsequent to the replay instance.

At block 718, the RAT 134 predicts that the load instruction collides with the older store instruction whose ROB index may be calculated from the delta field 608 value associated with the matching SAAQ entry 602 and responsively makes the load instruction dependent upon the store instruction. That is, the RAT 134 generates an enhanced dependency 158 for the load instruction that specifies a ROB index that is the difference between the delta field 608 value of the matching SAAQ entry 602 determined at block 716 subtracted from the load instruction ROB index. Advantageously, because the load instruction now has a dependency upon the store instruction, the load and store instructions will be issued in order. In particular, the store instruction executes, i.e., generates its store address, in time for the MOB 182 to detect that it collides with the load address. Consequently, when the load instruction reaches the MOB 182, the MOB 182 will detect the store collision condition between the load and store and will forward the store data to the load instruction, assuming the store data is available. (If the store data is not available, the MOB 182 will replay the load instruction, as discussed below with respect to the embodiment of FIGS. 8-11.) In the example of Table 4, the RAT 134 will generate for the LD instruction in line (3) an enhanced dependency 158 that specifies the ST instruction in line (2) because the delta 608 value is one (or two in the STA embodiment), which causes the reservation stations 136 to wait to issue the LD until the ST (or the STA) has issued. Flow ends at block 718.

According to one embodiment the SAAQ 194 IP field 606 stores less than all the instruction pointer address bits; thus, if there is a match at block 716 there is no guarantee that the load instruction is the same load instruction replayed at block 708/712. It is also noted that there is no guarantee that there is even a store instruction in the ROB 172 at the calculated index, or that, if there is, its store address collides with the load instruction load address. Rather, the RAT 134 is making a prediction. However, the present inventors have observed a significant reduction in the number of load replays by employing the embodiment of FIGS. 6-7 even though there is a possibility of misprediction by the RAT 134.

An advantage of the embodiments of FIGS. 6-7 described above and the embodiments of FIGS. 8-11 described below over the system of U.S. Pat. No. 6,006,326 described above is that they potentially do not require as much storage space as the color bits array, which provides the concomitant space and power cost saving advantages described above. Although each entry of the SAAQ or SDAQ+SDDQ potentially stores more bits than one embodiment of the color bits array, the number of entries in the SAAQ or SDAQ+SDDQ is likely much smaller than the number of entries in the color bits array since the color bits array includes an entry for each instruction (or possibly block) of the instruction cache; whereas, the number of entries in the SAAQ or SDAQ+SDDQ may be much smaller. For example, in one embodiment of the microprocessor, the present inventors have found that a SAAQ with four entries provides a significant reduction in the number of load replays and that a SDAQ with four entries along with a SDDQ with two entries provides a significant reduction in the number of load replays.

Another advantage of the embodiments of FIGS. 6-7 described above and the embodiments of FIGS. 8-11 described below over the system of U.S. Pat. No. 6,006,326 described above is that they potentially provide a greater reduction in load replays because they provide a finer granularity of the causes of load instruction replays, and attempt to predict the store collision in different ways based on the different causes.

The embodiments of FIGS. 6-7 populate an entry in the SAAQ 194 only if the replay was caused because a completed load instruction received incorrect data because an older store instruction whose address had not yet been generated by the MOB 182 collides with the load instruction, and consequently the MOB 182 did not detect that it needed to forward the store data of the colliding store instruction to the load instruction. However, the present inventors have determined that there are some store collision-induced load replays that are not predicted by the embodiments of FIGS. 6-7. In particular, some load instruction replays may occur because the MOB 182 detects that when it executed a load instruction, it provided incorrect data to the load instruction because it detected a store collision between the load address and store address, but the store data of the colliding store instruction was not available. Advantageously, the embodiments of FIGS. 8-11 address this situation. In particular, the RAT 134 attempts to generate an enhanced dependency for the load instruction such that the load instruction shares a dependency of the store instruction such that the load instruction does not issue for execution until the instruction upon which the store instruction depends for its store data has issued, as described below.

Figure 8:
FIG. 8 is a block diagram illustrating an entry in the store data alias queue (SDAQ) of FIG. 1 according to the present invention.

Referring now to FIG. 8, a block diagram illustrating an entry 802 in the store data alias queue (SDAQ) 196 of FIG. 1 according to the present invention is shown. The SDAQ entry 802 holds information associated with a load instruction that was replayed because it received incorrect data because its load address collided with an older store instruction whose store data was not available when the MOB 182 executed the load instruction. The RAT 134 allocates, populates, and uses the SDAQ entries 802 as described below with respect to FIGS. 10 and 11. The SDAQ entry 802 includes a valid bit 804 that indicates whether the entry 802 is valid. In response to a reset, the microprocessor 100 initializes all entries 802 in the SDAQ 196 to invalid, i.e., clears the valid bit 804 of each SDAQ entry 802. Additionally, in one embodiment, the valid bit 804 of each SDAQ entry 802 is cleared each time the code segment (CS) limit value in the x86 CS segment descriptor is written. The SDAQ entry 802 also includes an instruction pointer (IP) field 806 that stores the memory address at which the load instruction resides. In one embodiment, the IP 806 is the memory address of the next instruction after the load instruction, rather than the address of the load itself. The SDAQ entry 802 also includes a history field 808 that approximates the number of times the load instruction at the IP field 806 address has been replayed, as discussed in more detail below. In one embodiment, the history 808 value, when incremented, saturates at four. The SDAQ entry 802 also includes an index 812 field that holds the ROB index of the most recent instance of the load instruction at the address specified in the IP field 806. The SDAQ entry 802 also includes an index valid 814 field that indicates whether the value in the index field 812 is valid.

Figure 9:
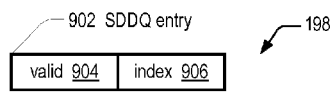
FIG. 9 is a block diagram illustrating an entry in the store data dependency queue (SDDQ) of FIG. 1 according to the present invention.

Referring now to FIG. 9, a block diagram illustrating an entry 902 in the store data dependency queue (SDDQ) 198 of FIG. 1 according to the present invention is shown. The SDDQ entry 902 holds dependency information associated with the most recent store instructions encountered by the RAT 134. The RAT 134 allocates, populates, and uses the SDDQ entries 902 as described below with respect to FIGS. 10 and 11. The SDDQ entry 902 includes a valid bit 904 that indicates whether the entry 902 is valid. In response to a reset, the microprocessor 100 initializes all entries 902 in the SDDQ 198 to invalid, i.e., clears the valid bit 904 of each SDDQ entry 902. Additionally, the ROB 172 invalidates entries 902 in the SDDQ 198 when it retires an instruction whose ROB index matches the index field 906 of a SDDQ entry 902 in a manner similar to that described above with respect to FIG. 4 in which the ROB 172 invalidates SACQ entries 202. The SDDQ entry 902 also includes an index field 906 that holds the ROB index of the dependee instruction from which the store instruction depends for its store data, if any. In one embodiment, the RAT 134 populates the index field 906 with a predetermined value to indicate that the store instruction has no dependencies for its store data.

Figure 10:
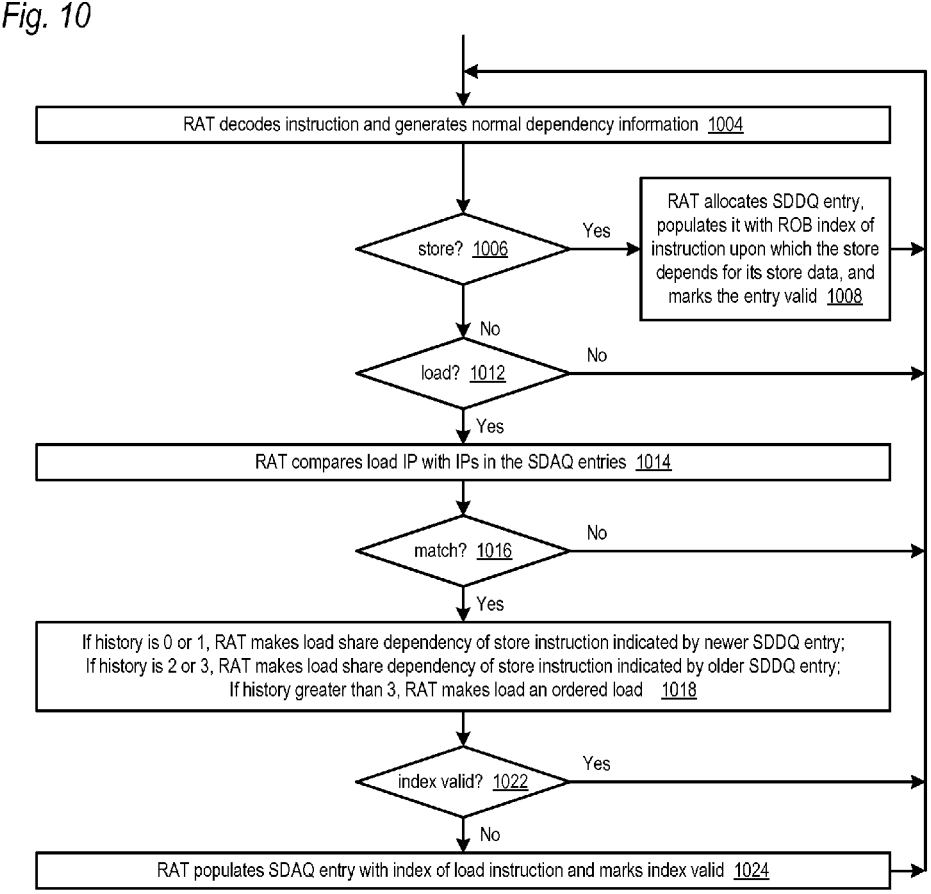
FIG. 10 is a flowchart illustrating operation of the microprocessor of FIG. 1 to generate enhanced dependency information for a load instruction to potentially avoid a replay in the presence of a store collision according to the present invention.

Referring now to FIG. 10, a flowchart illustrating operation of the microprocessor 100 of FIG. 1 to generate enhanced dependency information for a load instruction to potentially avoid a replay in the presence of a store collision according to the present invention is shown. Flow begins at block 1004.

At block 1004, the RAT 134 decodes an instruction and generates its normal dependency information, which is included in the dependency information 158 of FIG. 1. Flow proceeds to decision block 1006.

At decision block 1006, the RAT 134 determines whether the decoded instruction is a store instruction. If so, flow proceeds to block 1008; otherwise, flow proceeds to decision block 1012.

At block 1008, the RAT 134 allocates an entry 902 in the SDDQ 198. That is, logically the RAT 134 pushes an entry 902 into the tail of the SDDQ 198, which logically pushes out the entry 902 at the head of the SDDQ 198. The RAT 134 then populates the index field 906 with the ROB index of the dependee instruction from which the store instruction depends for its store data, if any. Finally, the RAT 134 sets the valid bit 904. In one embodiment, the store instruction is actually two separate microinstructions: a store address (STA) microinstruction and a store data (STD) microinstruction, as discussed above. In this embodiment, the RAT 134 allocates the entry 902 in the SDDQ 198, populates the index field 906 with the ROB index of the dependee instruction from which the STD instruction depends for its store data, if any, and sets the valid bit 904 when it sees the STD instruction. Flow returns to block 1004.

At decision block 1012, the RAT 134 determines whether the decoded instruction is a load instruction. If not, flow returns to decision block 1004; otherwise, flow proceeds to block 1014.

At block 1014, the RAT 134 compares the instruction pointer value of the load instruction with the IP field 806 in each of the valid entries 802 of the SDAQ 196. Flow proceeds to decision block 1016.

At decision block 1016, the RAT 134 determines whether the comparison performed at block 1014 yields a match with any of the SDAQ entries 802. If not, flow returns to block 1004; otherwise, flow proceeds to block 1018. According to one embodiment the SDAQ 196 IP field 806 stores less than all the instruction pointer address bits; thus, if there is a match at 1016 there is no guarantee that the load instruction is the same load instruction replayed at block 1104 of FIG. 11.

At block 1018, the RAT 134 examines the value of the history field 808 of the matching SDAQ entry 802. If the history 808 is 0 or 1, the RAT 134 makes the load instruction share a dependency with the store instruction as indicated by the index field 906 of the newer entry 902 in the SDDQ 198, and if the history 808 is 2 or 3, the RAT 134 makes the load instruction share a dependency with the store instruction as indicated by the index field 906 of the older entry 902 in the SDDQ 198 (in an embodiment in which the number of entries 902 in the SDDQ 198 is two). If the history 808 is greater than 3, the RAT 134 makes the load instruction an ordered load instruction; that is, the RAT 134 creates an enhanced dependency 158 for the load instruction such that the reservation stations 136 wait to issue the load instruction until all older store instructions (in one embodiment, STD instructions) have issued. Other embodiments are contemplated in which the number of entries in the SDDQ 198 is different than two and the RAT 134 selects an increasingly older store instruction of the SDDQ 198 as the value of the history 808 increases. Furthermore, other embodiments are contemplated in which the maximum value of the history 808 is greater than four and in which the threshold values of the history 808 may be different than those described in the embodiment of FIG. 10. The RAT 134 only makes the load instruction share the dependency of a store instruction indicated by an SDDQ entry 902 if the entry 902 is valid; otherwise, if there are no valid SDDQ entries 902, then according to one embodiment the RAT 134 makes the load instruction an ordered load, and according to another embodiment the RAT 134 does not generate an enhanced dependency for the load instruction. Flow proceeds to decision block 1022.

At decision block 1022, the RAT 134 determines whether the index valid bit 814 is set for the SDAQ entry 802 matched at decision block 1016. If the entry SDAQ entry 802 is valid, flow returns to block 1004; otherwise, flow proceeds to block 1024.

At block 1024, the RAT 134 populates the SDAQ entry 802 index field 812 with the ROB index of the current instance of the load instruction at the address specified in the IP field 806, i.e., the ROB index of the load instruction encountered by the RAT 134 at block 1004, and sets the index valid bit 814. Flow returns to block 1004.

Figure 11:
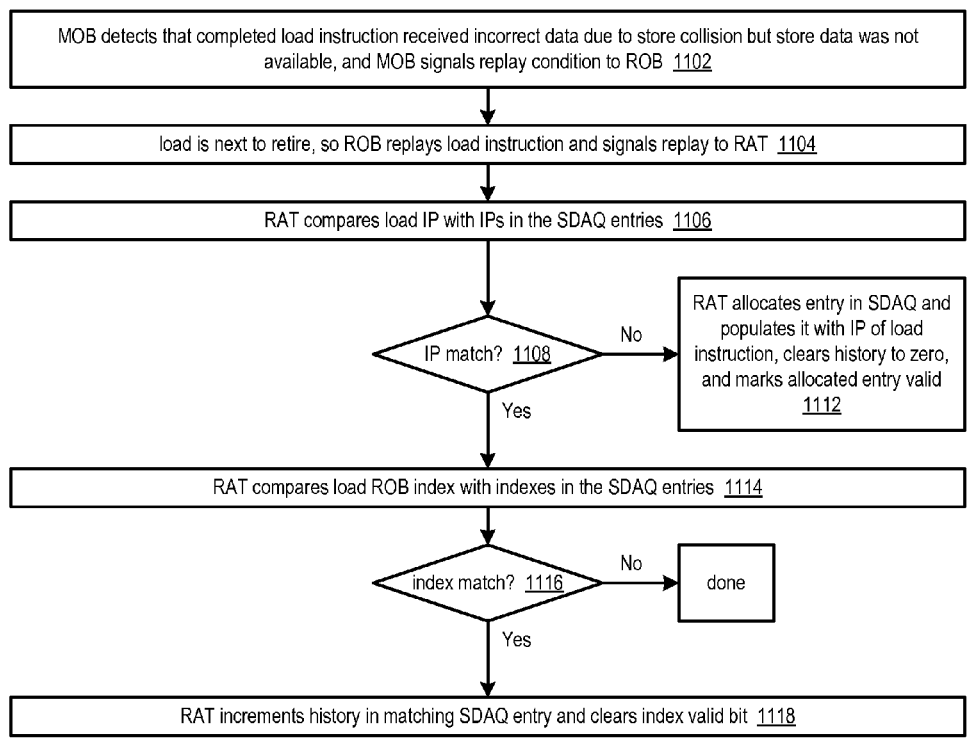
FIG. 11 is a flowchart illustrating operation of the microprocessor of FIG. 1 to allocate and update entries in the SDAQ according to the present invention.

Referring now to FIG. 11, a flowchart illustrating operation of the microprocessor 100 of FIG. 1 to allocate and update entries 802 in the SDAQ 196 according to the present invention is shown. Flow begins at block 1102.

At block 1102, the MOB 182 detects that when it executed a load instruction, it provided incorrect data to the load instruction because it detected a store collision with a store instruction, but the store data was not available. In response, the MOB 182 generates the replay signal 166 to the ROB 172 to indicate the detected condition. In particular, the MOB 182 outputs the ROB index of the load instruction, which the ROB 172 uses to update the load instruction ROB 172 entry status to indicate that it needs to be replayed. Flow proceeds to block 1104.

At block 1104, the ROB 172 determines that the load instruction detected at block 1102 is next to retire, i.e., it has become the oldest instruction in the ROB 172. The ROB 172 sees that the load instruction is marked as needing to be replayed and responsively replays the load instruction. That is, the ROB 172 re-dispatches the load instruction and its associated dependency information 158 from the ROB 172 to the reservation stations 136 to await subsequent re-issuance to the execution units 138 and re-execution thereby. In one embodiment, the ROB 172 replays not only the load instruction, but also replays all instructions newer than the load instruction. Additionally, the ROB 172 generates the replay signal 168 to the RAT 134. Flow proceeds to block 1106.

At block 1106, in response to the replay signal 168 generated by the ROB 172 at block 1104, the RAT 134 compares the instruction pointer value of the replayed load instruction with the IP field 806 in each of the valid entries 802 of the SDAQ 196. Flow proceeds to decision block 1108.

At decision block 1108, the RAT 134 determines whether the comparison performed at block 1106 yields a match with any of the SDAQ entries 802. If not, flow proceeds to block 1112; otherwise, flow proceeds to block 1114.

At block 1112, the RAT 134 allocates an entry 802 in the SDAQ 196. That is, logically the RAT 134 pushes an entry 802 into the tail of the SDAQ 196, which logically pushes out the entry 802 at the head of the SDAQ 196. The RAT 134 then populates the IP field 806 with the instruction pointer value of the load instruction. The RAT 134 also clears the history 808 to zero. Finally, the RAT 134 sets the valid bit 804. Flow ends at block 1112.

At block 1114, the RAT 134 compares the load instruction ROB index with the index field 812 in each of the valid entries 802 of the SDAQ 196 whose index valid bit 814 is set. Flow proceeds to decision block 1116.

At decision block 1116, the RAT 134 determines whether the comparison performed at block 1114 yields a match with any of the SDAQ entries 802. If not, flow ends; otherwise, flow proceeds to block 1118.

At block 1118, the RAT 134 increments the history 808 in the matching SDAQ entry 802. The RAT 134 increments the history 808 because the load instruction was replayed at block 1104 for the reason determined at block 1102. However, it is noted that if the load instruction was replayed for another reason, such as the reason described with respect to block 702 of FIG. 7, the RAT 134 does not increment the history 808. Additionally, the RAT 134 clears the index valid bit 814. Flow ends at block 1118.

Operation of the microprocessor 100 of FIG. 1 according to embodiments of FIGS. 8-11 will now be described with respect to processing of the code sequence in Table 5 below. For simplicity, the load and store instructions in the examples do not include a displacement value. The instructions in lines (3) through (5) of Table 5 are similar to those of lines (1) through (3) of Table 4. However, they are preceded in program order in Table 5 by the ADD instruction in line (1) that adds the contents of R8 and R9 and places the result in R4, and the ST instruction in line (2) that stores the contents of R4 to memory at the store address computed by adding the contents of R1 and R2. Thus, the ST in line (2) has a normal dependency on the ADD in line (1), just as the ST in line (4) has a normal dependency on the ADD in line (3).

TABLE 5

| (1) | ADD | R4, | R8, | R9 |
|-----|-----|-----|-----|-----|
| (2) | ST  | R4, | R1, | R2 |
| (3) | ADD | R3, | R5, | R6 |
| (4) | ST  | R3, | R1, | R2 |
| (5) | LD  | R7, | R1, | R8 |

Assume that the LD in line (5) is replayed according to block 1104 of FIG. 11, and that the RAT 134 allocates and populates an entry 802 in the SDAQ 196 with the instruction pointer of the replayed LD according to block 1112 of FIG. 11. Typically, a replayed LD will successfully execute and retire when replayed since the colliding ST has already retired; this is because the LD is not replayed until it is the oldest unretired instruction in the microprocessor 100, which implies that the older colliding ST has retired. Assume the instructions of Table 5 are part of a loop of the program and that subsequently the program executes the instructions in Table 5 a second time such that the RAT 134 allocates and populates an entry 902 in the SDDQ 198 with the ROB index of the instruction upon which the ST in line (2) depends for its store data according to block 1008 of FIG. 10; the RAT 134 populates an entry 902 in the SDDQ 198 with the ROB index of the instruction upon which the ST in line (4) depends for its store data according to block 1008; the RAT 134 generates an enhanced dependency 158 for the LD in line (5) to make it share a dependency with the ST in line (4) according to block 1018 of FIG. 10; and the RAT 134 populates the index 812 of instruction pointer-matching SDAQ entry 802 with the index of the LD and sets the index valid bit 814 according to block 1024 of FIG. 10. This causes the reservation stations 136 to wait to issue the LD in line (5) until the ADD in line (3) executes, which also frequently causes the LD to be issued no sooner than the ST in line (4). This will likely avoid a replay of the LD instruction due to a store collision.

However, assume that it does not and that the LD must be replayed a second time for the reason determined at block 1102. The RAT 134 will increment the history 808 (now to one) and clear the index valid bit 814 according to block 1118. Further assume that subsequently the program executes the instructions in Table 5 a third time such that the RAT 134 allocates and populates the SDDQ entries 902 for the two ST instructions according to block 1008, generates an enhanced dependency 158 for the LD to make it share a dependency with the ST in line (4) according to block 1018, and populates the index 812 and index valid bit 814 according to block 1024.

Assume again that this does not avoid the replay and that the LD must be replayed a third time for the reason determined at block 1102. The RAT 134 will again increment the history 808 (now to two) and clear the index valid bit 814 according to block 1118. Further assume that subsequently the program executes the instructions in Table 5 a fourth time such that the RAT 134 allocates and populates the SDDQ entries 902 for the two ST instructions according to block 1008. This time, because the history 808 is two, the RAT 134 generates an enhanced dependency 158 for the LD to make it share a dependency with the ST in line (2) according to block 1018, and populates the index 812 and index valid bit 814 according to block 1024. This will likely avoid a replay of the LD instruction due to a store collision. However, if it does not and the pattern continues until the history 808 reaches four, the RAT 134 generates an enhanced dependency 158 for the LD to make it an ordered load according to block 1018, which will avoid a replay of the LD instruction due to a store collision.

The embodiments described herein may enable the microprocessor 100 to avoid performing a load instruction replay in many cases. However, as discussed above, it should be kept in mind that there may be other cases in which the embodiments may actually cause the microprocessor 100 to take longer to execute the load instruction. For example, in some cases the source address specified by the load instruction may turn out not to collide with the destination address specified by the store instruction such that the RAT "mispredicts" the store collision, in which case the enhanced dependency causes the reservation stations to delay issuing the load instruction needlessly. That is, absent the enhanced dependency, the reservation stations may have otherwise issued the load instruction for execution and the load instruction might have been executed correctly sooner without needing to be replayed. However, the present inventors have found that, for many programs, the benefit of the reduced number of load instruction replays greatly outweighs the consequences of the mispredictions by the present embodiments. This is likely due in part to the relatively large penalty associated with the replay, which in one embodiment is on the order of 15 clock cycles, relative to the penalty associated with the misprediction, which in one embodiment is on the order of one or two clock cycles. Another contributing factor for the benefit is the relatively high probability that the RAT correctly predicts the store collision.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An out-of-order execution hardware microprocessor for reducing a likelihood of having to replay a load instruction due to a store collision, the hardware microprocessor comprising:
    a queue of entries, each entry configured to hold information that identifies sources of a store instruction used to compute its store address and to hold a dependency that identifies a dependee instruction upon which the store instruction depends for its data; and
    a register alias table (RAT), coupled to the queue of entries, the RAT configured to encounter instructions in program order and to generate dependencies used to determine when the instructions may execute out of program order, wherein in response to encountering a load instruction the RAT determines whether sources of the load instruction used to compute its load address match the sources of the store instruction in an entry of the queue, and if so, causes the load instruction to share the dependency of the matching store instruction by making an issuing of the load instruction dependent upon the dependee instruction.

2. The hardware microprocessor of claim 1, further comprising:
    issue logic, coupled to the RAT, configured to issue the instructions for execution potentially out of program order based on the dependencies generated by the RAT, wherein the dependency of the matching store instruction shared by the load instruction increases a likelihood that the issue logic issues the load instruction for execution no sooner than the matching store instruction.

3. The hardware microprocessor of claim 1, further comprising:
    a memory subsystem, configured to execute load and store instructions, wherein the memory subsystem is further configured to indicate that a load instruction must be replayed when the load instruction load address collides with a store address of an older unexecuted store instruction.

4. The hardware microprocessor of claim 1, further comprising:
    a retire unit, coupled to the queue of entries, configured to retire instructions, further configured to invalidate an entry of the queue in response to retiring the dependee instruction upon which the store instruction depends for its data identified by the dependency in the entry of the queue;
    wherein the RAT does not consider invalid entries of the queue when it determines whether sources of the load instruction used to compute its load address match the sources of the store instruction in an entry of the queue.

5. The hardware microprocessor of claim 1, wherein in response to encountering an instruction that modifies one of the sources identified by the information in an entry of the queue, the RAT invalidates the entry of the queue, wherein the RAT does not consider invalid entries of the queue when it determines whether sources of the load instruction used to compute its load address match the sources of the store instruction in an entry of the queue.

6. The hardware microprocessor of claim 1, wherein the information that identifies sources of the store instruction used to compute its store address comprises one or more identifiers of one or more respective registers used to store one or more respective input operands to a calculation of the store address.

7. The hardware microprocessor of claim 1, wherein the information that identifies sources of the store instruction used to compute its store address comprises a displacement input to a calculation of the store address.

8. The hardware microprocessor of claim 1, wherein the RAT is configured to allocate one of the entries in the queue and to populate the allocated entry in response to encountering a store instruction.

9. A method for reducing a likelihood of having to replay a load instruction in an out-of-order execution microprocessor due to a store collision, the microprocessor having a register alias table (RAT) configured to encounter instructions in program order and to generate dependencies used to determine when the instructions may execute out of program order, the method comprising:
    allocating an entry in a queue of entries, in response to the RAT encountering a store instruction;
    populating information in the allocated entry that identifies sources of the store instruction used to compute its store address;
    populating the allocated entry to hold a dependency that identifies a dependee instruction upon which the store instruction depends for its data;
    determining, in response to the RAT encountering a load instruction, whether sources of the load instruction used to compute its load address match the sources of the store instruction in an entry of the queue; and
    causing the load instruction to share the dependency of the matching store instruction by making an issuing of the load instruction dependent upon the dependee instruction if the load instruction sources match the store instruction sources in an entry of the queue.

10. The method of claim 9, further comprising:
issuing the load instruction for execution no sooner than the matching store instruction with increased likelihood due to the dependency of the matching store instruction shared by the load instruction.

11. The method of claim 9, further comprising:
indicating that the load instruction must be replayed when the load instruction load address collides with a store address of an older unexecuted store instruction.

12. The method of claim 9, further comprising:
invalidating an entry of the queue in response to retiring the dependee instruction upon which the store instruction depends for its data identified by the dependency in the entry of the queue;
wherein the RAT does not consider invalid entries of the queue when said determining whether sources of the load instruction used to compute its load address match the sources of the store instruction in an entry of the queue.

13. The method of claim 9, further comprising:
encountering an instruction that modifies one of the sources identified by the information in an entry of the queue; and
invalidating the entry of the queue, in response to said encountering the instruction that modifies one of the sources identified by the information in an entry of the queue;
wherein the RAT does not consider invalid entries of the queue when said determining whether sources of the load instruction used to compute its load address match the sources of the store instruction in an entry of the queue.

14. The method of claim 9, wherein the information that identifies sources of the store instruction used to compute its store address comprises one or more identifiers of one or more respective registers used to store one or more respective input operands to a calculation of the store address.

15. The method of claim 9, wherein the information that identifies sources of the store instruction used to compute its store address comprises a displacement input to a calculation of the store address.

16. A computer program product for use with a computing device, the computer program product comprising:
a non-transitory computer usable storage medium, having computer readable program code embodied in said medium, for specifying an out-of-order execution microprocessor for reducing a likelihood of having to replay a load instruction due to a store collision, the computer readable program code comprising:
first program code for specifying a queue of entries, each entry configured to hold information that identifies sources of a store instruction used to compute its store address and to hold a dependency that identifies a dependee instruction upon which the store instruction depends for its data; and
second program code for specifying a register alias table (RAT), coupled to the queue of entries, the RAT configured to encounter instructions in program order and to generate dependencies used to determine when the instructions may execute out of program order, wherein in response to encountering a load instruction the RAT determines whether sources of the load instruction used to compute its load address match the sources of the store instruction in an entry of the queue, and if so, causes the load instruction to share the dependency of the matching store instruction by making an issuing of the load instruction dependent upon the dependee instruction.

17. The computer program product for use with a computing device of claim 16, the computer program product further comprising:
third program code for specifying issue logic, coupled to the RAT, configured to issue the instructions for execution potentially out of program order based on the dependencies generated by the RAT, wherein the dependency of the matching store instruction shared by the load instruction increases a likelihood that the issue logic issues the load instruction for execution no sooner than the matching store instruction.

18. The computer program product for use with a computing device of claim 16, the computer program product further comprising:
third program code for specifying a memory subsystem, configured to execute load and store instructions, wherein the memory subsystem is further configured to indicate that a load instruction must be replayed when the load instruction load address collides with a store address of an older unexecuted store instruction.

19. The computer program product for use with a computing device of claim 16, the computer program product further comprising:
third program code for specifying a retire unit, coupled to the queue of entries, configured to retire instructions, further configured to invalidate an entry of the queue in response to retiring the dependee instruction upon which the store instruction depends for its data identified by the dependency in the entry of the queue;
wherein the RAT does not consider invalid entries of the queue when it determines whether sources of the load instruction used to compute its load address match the sources of the store instruction in an entry of the queue.

20. The computer program product for use with a computing device of claim 16, wherein the information that identifies sources of the store instruction used to compute its store address comprises one or more identifiers of one or more respective registers used to store one or more respective input operands to a calculation of the store address.

* * * * *